United States Patent
Camhi et al.

[11] Patent Number: 5,930,444
[45] Date of Patent: Jul. 27, 1999

[54] SIMULTANEOUS RECORDING AND PLAYBACK APPARATUS

[76] Inventors: Elie Camhi, 131 Counry Ridge Rd., Scarsdale, N.Y. 10583; Lawrence S. Kamhi, 30 Saddle View Ct., Fairfield, Conn. 06430

[21] Appl. No.: 08/234,727

[22] Filed: Apr. 28, 1994

Related U.S. Application Data

[63] Continuation of application No. 07/872,435, Apr. 23, 1992, abandoned.

[51] Int. Cl.⁶ ..................................................... H04N 5/76
[52] U.S. Cl. ............................................. 386/46; 386/125
[58] Field of Search .................................... 358/335, 342, 358/341, 343; 360/33.1, 14.1, 13, 36.1, 27; 369/32, 54; 348/734; 386/46, 125, 126, 92, 68; H04N 5/76

[56] References Cited

U.S. PATENT DOCUMENTS

| | | | |
|---|---|---|---|
| 4,488,179 | 12/1984 | Kruger et al. | 348/734 |
| 4,626,847 | 12/1986 | Zato | 348/734 |
| 4,706,121 | 11/1987 | Young | 358/142 |
| 4,856,081 | 8/1989 | Smith | 348/734 |
| 4,908,713 | 3/1990 | Levine | 358/335 |
| 5,134,499 | 7/1992 | Sata et al. | 358/335 |
| 5,170,388 | 12/1992 | Endoh | 386/104 |
| 5,172,111 | 12/1992 | Olivio, Jr. | 360/27 |
| 5,181,114 | 1/1993 | Richards et al. | 358/310 |
| 5,257,142 | 10/1993 | Hong | 358/335 |

*Primary Examiner*—Thai Tran
*Assistant Examiner*—Huy Nguyen
*Attorney, Agent, or Firm*—Natter & Natter

[57] ABSTRACT

A keyboard equipped audiovisial recording and playback device is provided having an input and an output adapted for connection between a users signal source and display device, respectively, and a memory unit with a storage medium enabling random access to programming information stored therein. A keyboard responsive control circuit enables manipulation and transfer of programming information between the input, output and memory. Because of the relative high speed of the control circuitry and memory access, substantially simultaneous recording and playback of television type signals is achieved, thus enabling user controlled programming delay.

14 Claims, 5 Drawing Sheets

SIMULTANEOUS RECORDING AND PLAYBACK APPARATUS

CROSS REFERENCE TO RELATED APPLICATION

This application is a Continuation of applicant's application Ser. No. 07/872,435 filed Apr. 23, 1992, now abandoned.

FIELD OF THE INVENTION

The present invention relates to information and entertainment systems, and more particularly, to a keyboard and memory equipped interface apparatus for the storage and processing of signals associated with such information and entertainment systems.

BACKGROUND OF THE INVENTION

Audio and audiovisual type information and entertainment systems have become well known in recent years. These systems include not only well known broadcast radio and television media, but a plethora of systems and accessories that are intended to enhance and expand the use of television media, such as recorders, cable television networks, pay per view custom programming systems, and addressable receivers. Audiovisual recorders, commonly known as video cassette recorders, (VCR's) have become perhaps the most commonplace addition to all of these systems, enabling greater user control of the received audio and video programming.

VCR's are helpful for the storage of broadcast information so that it will not be missed by a user who is unavailable for its reception, by enabling the selective recording, often unattended, of audio and video information on a reel to reel style magnetic tape housed within a casesette. Furthermore, the features of many VCR's include control variations which aesthetically enhance the stored information during playback. While the programmability and enhanced features of many VCR's allow great user flexibility in the playback of recorded information, the construction of these reel to reel recorders and their media limit the flexibility of their usage in the accumulation of information to situations where an entire desired program of information or the terminal portion thereof is to be recorded because the user is absent or indisposed.

Frequently, programming is missed by the user due to interruptions of a more temporary nature, such as telephone calls, ringing doorbells, bathroom trips, etc.

While VCR's, as they are presently known, can be used to capture the missed programming segment under these circumstances of interruptions having a duration of less than the entire terminal portion of the desired programming, the user typically wishes to resume watching the programming immediately upon conclusion of the temporary interruption. In such a situation, the user will watch the recorded interrupted portion of the programming after having watched the end of the programming. This results in a substantial loss of continuity in so far as there may have been a significant event during the interrupted portion, thus making the post interruption segment difficult to understand or appreciate due to its reliance upon the information during the interrupted segment. This kind of situation is likely to occur in the case where the desired programming is a movie, or more so in the case of educational programming, where earlier presented information provides a foundation for the understanding of later presented information. Conversely, the opposite is also possible, where after having seen the end of the desired programming, the recorded interrupted intermediate segment suffers such diminution in value so as to be of little or no value for watching, thus making the recording thereof gratuitous.

Alternatively, the user is faced with recording the entire terminal portion of the desired programming so that upon completion of recording, the user may then resume watching the programming from the point at which the programming was interrupted. In this sort of situation, the user may end up waiting idly for completion of terminal segment recording. This can be undesirable, especially if the interruption occurs at an early point during the desired programming, and where the desired programming is lengthy.

Furthermore, another deficiency associated with prior art recorders and VCR's relates to the linear nature of access to information stored on the reel to reel media employed by these devices. Very often VCR users wish to watch programming stored at one location on the media while at the same time storing new programming information at a different location on the same media. Even though the rate at which modern electronic circuits and microprocessors is sufficiently fast to process both the storage of information from one received program and retrieval of stored program information so as to be effectively simultaneous from the user's perspective, because the magnetic heads can only access the small portion of media between the reels, and because the overwhelming majority of the storage media is wound onto the reels at any given moment, it is virtually impossible to access the media for information storage and retrieval at more than one location in substantially simultaneous fashion.

Consequently, a need exists for an improved recorder for audio or video signals or both.

OBJECTS AND ADVANTAGES

It is therefore an object of the present invention to provide an audio video recorder and play back apparatus having structure which enables the user to accommodate an interruption having lesser duration than the terminal portion of the desired programming, while minimizing the impact of the interruption on the viewer.

It is another object of the present invention to provide a recorder and play back apparatus for audio or audiovisual signals which is adapted to record and play substantially simultaneously.

Yet another object of the present invention is to provide a recorder and play back apparatus for audio or audiovisual signals adapted to enable random access to the storage media in a non linear manner.

Still another object of the present invention to provide a recorder and play back apparatus for audio or audiovisual signals which enables a user who is temporarily interrupted to resume reviewing the desired programming from the point of interruption immediately upon conclusion of the interruption.

It is a further object of the present invention to provide an audiovisual recorder and play back apparatus which enables a viewer who is temporarily interrupted to resume watching the desired programming so that the portion of desired programming beginning at the point of interruption can be viewed in proper sequence to the end, with the resumed viewing beginning at the time of conclusion of the interruption.

Yet another object of the present invention is to provide an audiovisual recorder and play back apparatus which is adapted to accept input signals carrying programming information for storage or retransmission or both in a plurality of formats, or from a plurality of sources.

Other objects and advantages of the present invention will become obvious to those of skill in the art upon contemplation of the disclosure herein in conjunction with the drawings.

SUMMARY OF THE INVENTION

According to the instant invention, a keyboard equipped recorder is provided which achieves the aforementioned objectives. A key element of the apparatus is memory storage media which has structure adapted to enable substantially random access to information storage locations of the media. The apparatus has at least one input and at least one output so that it may be interposed between the user's signal source and display device. The apparatus further has a user operated keyboard and control circuitry responsively coupled thereto for user selective initiation and termination of recording, as well as buffering type simultaneous recording and playback.

BRIEF DESCRIPTION OF THE DRAWINGS

In the drawings, wherein the same numbers are used to designate the same elements throughout the several views.

DETAILED DESCRIPTION OF THE PREFERRED EMBODIMENTS

Figure 1:
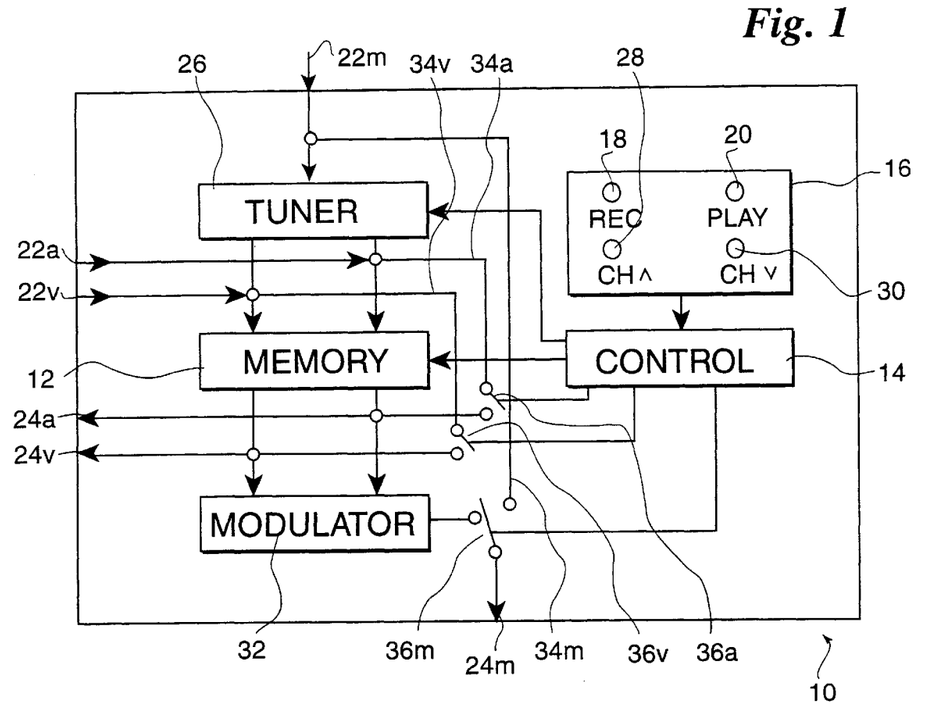
FIG. 1 is a block diagram of a first embodiment of the audiovisual recorder of the instant invention.

Turning now to the drawing of FIG. 1, a basic block diagram of the audiovisual recorder of the instant invention is shown, indicated generally by the numeral 10. While the device will be referred to herein as a recorder, it should be kept in mind that the device necessarily performs as a playback unit as well for the stored information accumulated during the recording function of the instant invention. A key element of recorder 10 is memory unit 12, which is responsively coupled to control circuit 14 for the selective storage or retrieval of information or both, to and from memory unit 12 as the case may be. Control circuit 12 is in turn responsively coupled to keyboard 16 which has at least one record key 18, and at least one playback key 20, for user control of the instant invention.

Memory unit 12 includes storage media having structure adapted to enable substantially immediate access to stored information at any point thereon. The storage media contemplated for memory unit 12 would include solid state memory, magnetic disk, or read/write optical disk, but not reel to reel magnetic tape as used by heretofore known video recorders, due to the aforementioned linear nature of media access dictated by the structure of the reel to reel media.

Each of the aforementioned media contemplated has distinct advantages and disadvantages when compared to the others. Solid state memory, offering speed as its primary advantage, would provide the best performance when applied to the present invention, however, at the present time such memory is relatively expensive, with pricing beginning at about $40 per megabyte (70 ns). Read/write optical disks offer the advantage of gigabyte range storage capacity, but their availability is limited and their cost high because industry standardization is still in the negotiation stages, although price and availability are expected to improve in the near future. Magnetic disk media, while not offering the speed of solid state nor the capacity of optical disks, have made dramatic improvements recently in terms of speed, capacity, and most notably, price, current pricing being about $400 for 180 megabyte units (19 ms). Another advantage of the optical and magnetic disk media is their structural adaptability for easy removal and replacement in the host recorder, thus approximating the removable feature of cassettes of presently known VCR's. Such removable cassette type media structure can also be achieved with solid state memory by the use of non volatile ram, or alternatively, low power memory such as CMOS in conjunction with a battery or capacitor or similar power source to maintain stored information, albeit at even higher cost than previously mentioned.

Recorder 10 also has one or more information inputs, 22, adapted to be connected to the user's information source, and one or more information outputs, 24, adapted to be coupled to the user's display devices such as television sets or video monitors and audio systems. Inputs 22a and 22v, as shown, are intended for connection to raw audio and video signal types, respectively, where such is the nature of the user's information sources. These inputs are coupled to memory unit 12, and the audio and video signals are stored therein upon user actuation of record key 18. Input 22m is adapted to be coupled to an information source where the audio and video signals are modulated onto a carrier frequency, such as is the case in conventional television signals received via antenna or cable TV type information sources. Accordingly, input 22m is first coupled to tuner 26 which converts the modulated signal into raw audio and video signals, whereupon the audio and video signals are then coupled to memory unit 12 and stored therein upon user actuation of record key 18. Ideally, tuner 26 is like the tuner of a radio, television or VCR, enabling the user to select one from a number of carrier frequencies for demodulation. Thus keyboard 16 is equipped with channel up key 28 and channel down key 30, coupled to tuner 26 via control circuit 14 to achieve this channel selection function.

Upon user actuation of playback key 20, information stored in memory unit 12 is retrieved and coupled to outputs 24a and 24v, as audio and video signals, respectively. Outputs 24a and 24v, as shown, provide for user connection of raw audio and video signal types, respectively, to the user's display devices where those devices are adapted for input signals in such a format, such as video monitors or audio systems, or even VCR's. Modulator 32 is connected to the audio and video signals retrieved from memory unit 12, and remodulates these signals onto a carrier frequency, and couples this signal to output 24m for instances where the user's display device is a television, which requires a modulated input signal.

Each input 22a, 22v, and 22m is coupled to a corresponding output 24a, 24v, and 24m, respectively, by a bypass line 34a, 34v, and 34m. Furthermore, each bypass line has a serially oriented bypass switch 36a, 36v, and 36m, each switch being coupled responsively to control circuit 14, which is adapted to selectively open the circuit between those corresponding inputs and outputs during playback operation of recorder 10. Thus upon user actuation of the play key 20 of keyboard 16, the coupling of signals between the inputs 22 and their corresponding outputs 24, via bypass lines 34, is disabled by switches 36, which assume the states shown in FIGS. 1 through 3. This insures that information present on the inputs 22 is prevented from interfering with the information retrieved from memory unit 12 and coupled to outputs 24.

Basic operation of the instant invention begins with the user watching or listening to desired programming, and recorder 10 off. Then comes a temporary information such as a telephone call, whereupon the user actuates record key 18. Control circuit 14 initiates storing information present on input 22 in a recording within memory unit 12. Upon conclusion of the telephone call, the user actuates playback key 20, and control circuit 14 initiates sequential retrieval from memory unit 12 of the stored information from the beginning of the recording, while storage of information present at the input 22 continues substantially simultaneously. The user resumes the desired programming from the point at which the interruption occurred, the desired programming information being presented to the user with a time delay effect, the time delay being the length of the interruption so that the user has missed no information as a result of the interruption.

Figure 2:
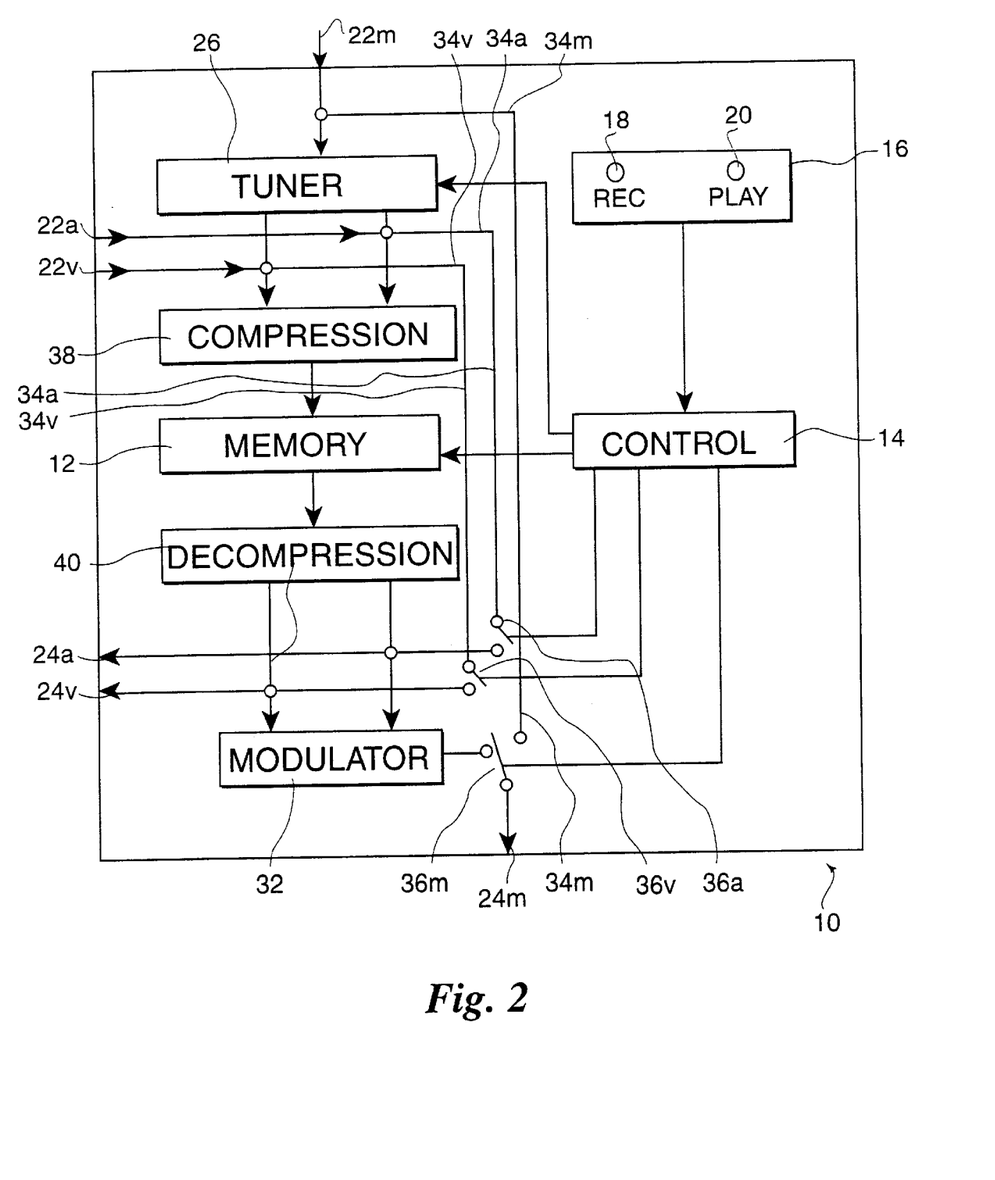
FIG. 2 is a block diagram of a second embodiment of the audiovisual recorder of the instant invention.

Turning now to FIG. 2, a block diagram of a second embodiment of the instant invention is shown, having a data compression circuit, 38, interposed between inputs 22 and memory unit 12. A plethora of data compression algorithms exists today, and the number grows daily with increasing efficiency related to development of those algorithms and hardware developed for their implementation. Indeed, compression rates of 90% and more have been achieved, although the efficiency of such systems depends upon the format and content of the information to be stored. Compression is performed upon the information present on inputs 22 before the information is passed to memory for storage. Since the compressed stored information is no longer in its original format, it must again be processed before it can be transmitted to the output 24. Accordingly, the embodiment of FIG. 2 also includes a data decompression circuit 40 interposed between memory unit 12 and outputs 24.

As mentioned above, recent advances in the field of data compression have resulted in greater degrees of size reduction for stored programs, and that such compression is achieved at throughput rates higher than ever before due to improved hardware and software, the fact remains that data compression and decompression still takes time. This decompression necessarily affects the rate at which information retrieved from memory unit 12 can be transferred to outputs 24. On the other hand, since the application of data compression techniques can reduce the memory necessary to store information, the impact of high cost per unit of solid state memory can be substantially reduced, thus adding to the commercial practicality of application of otherwise expensive solid state memory to memory unit 12. When this is considered in light of the fact that solid state memory offers data access time more than a million times faster than that of more affordable magnetic disk media, the additional time necessary for retrieval, decompression and output becomes insignificant as compared to alternative media.

Figure 3:
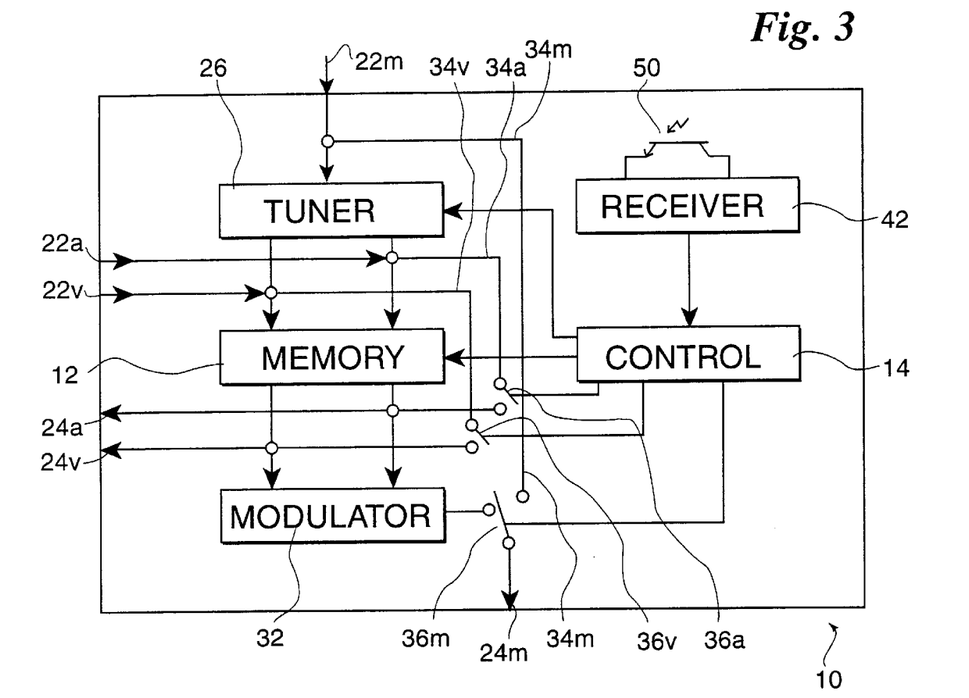
FIG. 3 is a block diagram of a third embodiment of the audiovisual recorder of the instant invention as contemplated for use with a remote control keyboard.
Figure 4:
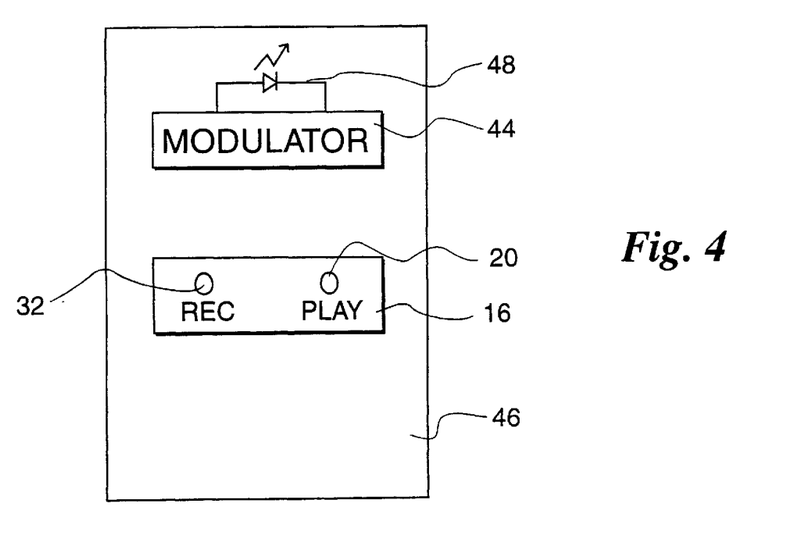
FIG. 4 is an diagrammatic representation of a remote control keyboard as contemplated for use in conjunction with the audiovisual recorder of FIG. 3.

Turning now to FIGS. 3 and 4, a further embodiment of the instant invention is shown. Therein, receiver 42 and transmitter 44 are interposed between control circuit 14 and keyboard 16 for communication therebetween so as to enable keyboard 16 to be placed within a discrete remote control housing 46. Although a wide variety of remote control systems may be applied to the present invention without departure from the spirit or scope thereof, the preferred arrangement applies infra red light emitting diode 48 to transmitter 44 and infra red photo detector 50 to receiver 42 to achieve wireless communication between the two.

It should be noted that the power source contemplated for remote control unit 46 is batteries, as opposed to AC power source contemplated for recorder 10, however alternative power sources may be applied to the instant invention without departure from the spirit or scope thereof.

Figure 5:
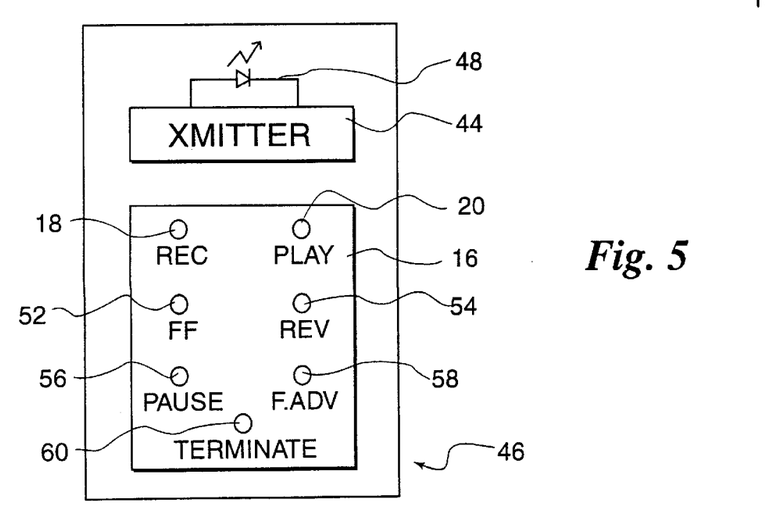
FIG. 5 is a diagrammatic representation of an enhanced function remote control keyboard as contemplated for use in conjunction with the audiovisual recorder of FIG. 3.

Turning now to FIG. 5, a more elaborate variation of remote control unit 46 is shown, which like the remote control of FIG. 4, is contemplated for use in conjunction with a receiver equipped recorder as shown in FIG. 3. The enhanced remote control has additional function keys intended for use during time delay playback by recorder 10, as described above and initiated by user actuation of playback key 20. These additional function keys include fast forward 52 and reverse 54, pause 56, and frame advance 58. Control circuit 14 is adapted to respond to user actuation of these keys by controlling the rate and sequence with which stored information retrieved from memory unit 12 is transferred to outputs 24 for display. This enables the recorder of the instant invention to approximate the enhanced playback features which have become well known from their presence on all but the least expensive VCR's presently known and marketed. It should be noted that control circuit 14 is adapted to respond to the forward and reverse keys in momentary fashion, implementing the appropriate rate and sequence of transfer of information from memory 12 to output 24 only while actuation of those keys is maintained. This is unlike the on and off toggling type function performance control circuit 14 is intended to execute in response to actuation of record key 18, playback key 20, and pause key 56.

The operation of frame advance key 58, which is used in conjunction with the pause function, is contemplated to advance one frame each time the key is actuated by the user, although ideally, maintained actuation of the frame advance key for more than a period of one or two seconds would result in the successive advance of stored frames in slow motion stop action fashion.

An additional use is contemplated for pause key 56 and frame advance key 58, which enables the user to check for the presence of subliminal or other unwanted information included within the stored programming. This function is achieved by initiating playback of the stored programming information, and the using pause key 56 in conjunction with frame advance key 58 to individually step through and review each of the frames within the stored program or a portion thereof.

Also shown on the keyboard of the remote control of FIG. 5 is terminate key 60, the actuation of which is responded to by control circuit 14 by cessation of storage of information present on input 22 and ending the storage of program information, but continuing the sequential play back of the stored information until the end of the stored program segment is reached. When the end of the stored program segment is reached, play back of the stored information is stopped, and recorder 10 reverts to a passive state, with information present at input 22 being coupled directly to output 24.

Figure 6:
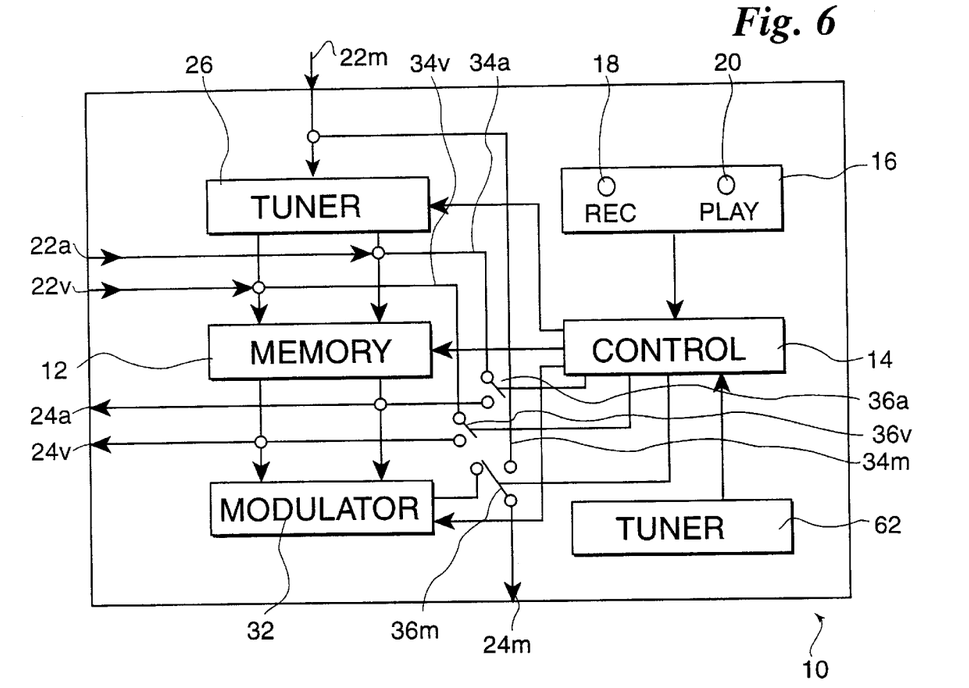
FIG. 6 is a block diagram of a programmable timer equipped variation of the instant invention.

In FIG. 6, another embodiment of the instant invention is shown, having programmable timer 62, to which control circuit 14 is responsively coupled for unattended beginning and ending of the recording function. So equipped, the instant invention may be used in circumstances where the user may not be available for manual execution of these functions. For example, if the user anticipates the possibility that there may be some delay in arriving in time for the beginning of desired programming, recording may be initiated by timer 62 after appropriate setting by the user. Timer 62 may also be applied to unattendedly cease the recording at a preselected time, and thereby conserve memory, for example in instances where the interruption or delayed arrival could possibly extend beyond the end of the desired programming.

Figure 7:
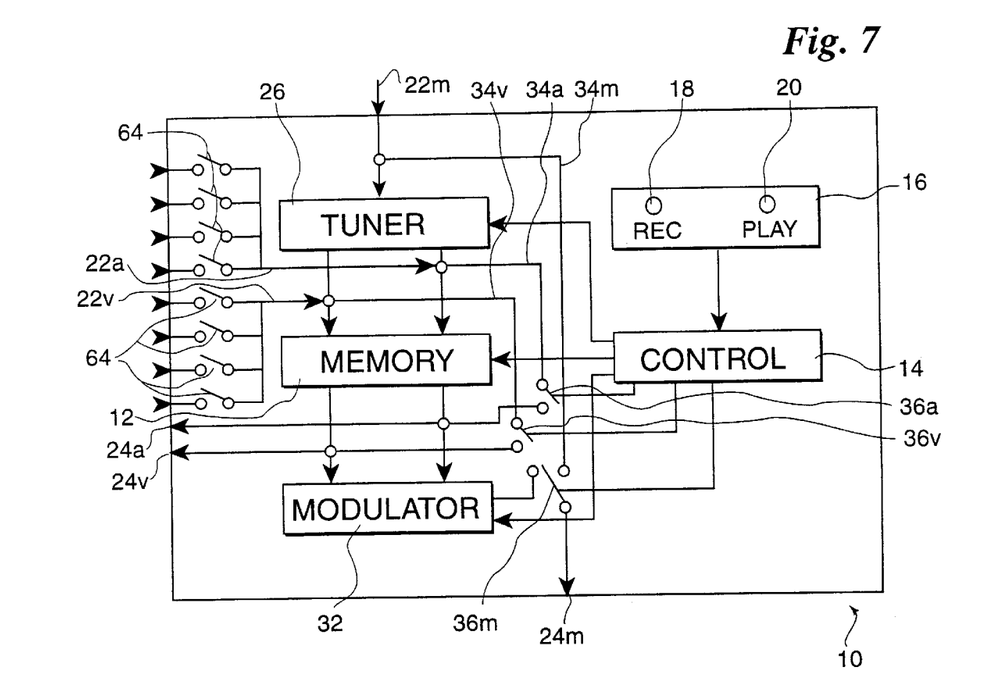
FIG. 7 is a block diagram of an embodiment of the present invention having multiple programmable input channels.

There are also occasions where it may be desirable to record audio in conjunction with video where the signals have differing origins. Perhaps the most common example of such an application is the 'simulcast', where a concert gets video coverage on a television channel, while a radio station broadcasts high(er) fidelity audio coverage of the concert. Another such application includes sporting or news events which are broadcast on a television channel, while the same event is being covered by a radio station having an announcer preferable to the user. Accordingly, FIG. 7 shows yet another embodiment of the present invention having multiple programmable input switches 64, which allow for connection and coupling of inputs 22 to a plurality of signal sources, so as to enable the selection and recording of audio and video signals of differing origins. Should a user wish to record the separate audio and video coverages of the same event, the switches coupled to the desired signal sources would be closed. Switches 64 may be of the type requiring manual actuation, but could also be of the automatic programming type, which would add to the complexity and cost of the unit. In either arrangement, audio frame AM, FM, shortwave, or other origins may be selected, and likewise, video signals from broadcast, cable, microwave or other varying origins may also be selected.

Figure 8:
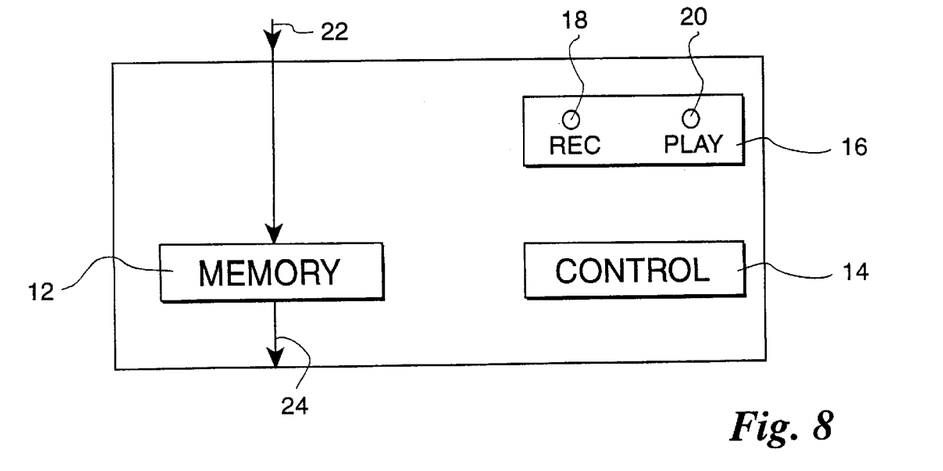
FIG. 8 is a block diagram of yet another embodiment of the present invention, having singular input and output channels.

Turning now to FIG. 8, the most basic block diagram of the instant invention is shown, having a singular input 22 and output 24, which would enable the simultaneous buffering type recording and time delay play back of an audio only input signal. Such an embodiment of the instant invention would be useful for a visually impaired person or for instances where the desired programming information is audio only.

Furthermore, if the sample rate, speed and capacity of memory unit 12 is sufficiently high, the singular input 22 of FIG. 8 may be coupled to an antenna or cable TV source, and singular output 24 coupled to a television, VCR, or other tuner equipped device, thereby enabling the recording of a multiplicity of channels of programming information together, for separation and channel selection via the external tuner equipped device during playback.

Figure 9:
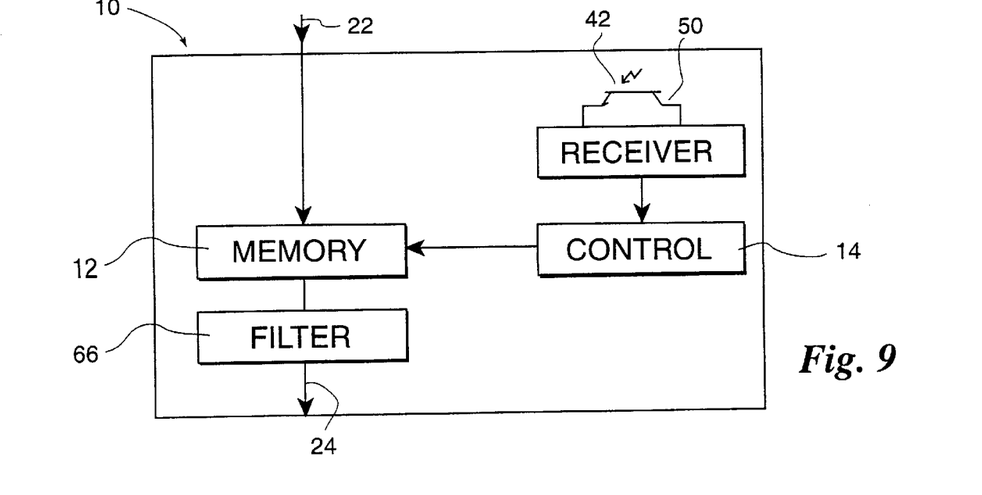
FIG. 9 is a block diagram of a filter equipped embodiment of the present invention.

Hardware may also be added to the instant invention to implement automatic checking for subliminal or otherwise unwanted or unsolicited transmissions, as illustrated in FIG. 9. Therein, filter 66 is interposed between memory unit 12 and output 24, and is programmed to screen information retrieved from memory according to a predetermined pattern. One example of such a pattern which would typify subliminal information would be two sequential substantially similar frames of information which are bordered by a multiplicity of frames of information, the bordering frames being substantially similar to each other, while differing substantially from the bordered frames. Such a pattern would indicate the transmission includes information brief enough to escape conscious detection by the user, although of sufficient duration to be detected sub consciously. Upon detecting information meeting the predetermined parameters of filter 66, a variety of scenarios may then be implemented, the simplest of which is merely refraining from outputting the suspect information to output 24. Alternatively or in addition, filter 66 may illuminate a lamp or actuate some other indicator, such as an audible alert or an on screen display, to call the user's attention to the presence of such information, whereupon the user may then act accordingly.

While the above specification contains many specificities, these should not be construed as limitations on the scope of the instant invention, but rather as an exemplification of the preferred embodiments thereof. Accordingly, the scope of the instant invention should not be determined by the embodiments shown, but rather by the claims appended hereto and their legal equivalents.

What is claimed is:

1. A recording and playback apparatus for the substantially immediate and seamless resumption of interrupted perception of program information based upon audio or video signals, or both, without missing the program information presented during the interruption, comprising:

means for powering the apparatus;

a keyboard having a record key and a playback key;

a control circuit coupled responsively to said keyboard;

a memory unit coupled responsively to said control circuit, said memory unit having a medium for storage of information, said storage medium having structure which enables substantially random access to information stored in said medium for retrieval of the stored information from said storage medium;

at least one input, said input being connected to a user's audio/video program signal source and also being coupled to said memory unit so as to enable program information presented by the signal source to be transferred to and stored in said memory unit; and at least one output, said output being connected to a user's audio or video display device or both, said output further being connected to said memory unit so as to enable the transfer of program information from said memory unit to the user's display device, said control circuit being configured so that substantially simultaneous recording and playback of program information is achieved when said record key is first actuated to begin a recording by initiating storage of the broadcast program information in said memory unit, and said playback key is subsequently and solely actuated to begin time delay playback of the recording from the beginning thereof by initiating retrieval of the stored program information in said memory unit, with the interval of the time delay being the same as the time elapsed between the actuation of said record key and the subsequent actuation of said playback key.

2. The apparatus as set forth in claim 1, further comprising a remote control unit, and wherein said keyboard is housed in said remote control unit.

3. The apparatus as set forth in claim 2, further comprising means for wireless communication between said remote control unit and said control circuit.

4. The apparatus as set forth in claim 3, wherein said means for wireless communication is infra red.

5. The apparatus as set forth in claim 1, wherein said storage medium is removable from the apparatus by the user.

6. The apparatus as set forth in claim 5, wherein said storage medium comprises magnetic or optical disk memory.

7. The apparatus as set forth in claim 1, wherein said storage medium comprises solid state random access memory.

8. The apparatus as set forth in claim 1, wherein said keyboard further includes key means for enabling user control of the rate or sequence or both of transfer of program information from said memory unit to the user's display device, and such variation of rate or sequence results in a corresponding variation of the interval of the time delay.

9. The apparatus as set forth in claim 8, said control circuit being further configured to automatically discontinue both recording and playback functions, and resume normal real time display of broadcast program information when said key means for controlling the sequence and rate is subsequently used to advance the playback of stored information to a point where the interval of the time delay becomes negligable.

10. The apparatus as set forth in claim 8, wherein said key means includes a frame advance key for advancing the transfer of program information to the user's display device at a rate sufficiently slowly so that a user may review the content of the program information transferred from said memory unit on a frame by frame basis.

11. The apparatus as set forth in claim 1, further having at least one additional input, and all said inputs have programmable switches oriented serially therein so that said inputs may be coupled to a plurality of signal sources, and means for user setting of said programmable switches in which at least one of said plurality of signal sources is selected.

12. The apparatus as set forth in claim 1, further including a filter interposed between said memory unit and said output, said filter being for detecting covert program information according to one or more predetermined patterns, said predetermined patterns being indicative of unsolicited or otherwise unauthorized information within the stored program information.

13. The apparatus as set forth in claim 1, further comprising a timer circuit adapted to enable the pre programmed unattended initiation of recording.

14. A method for enabling the substantially immediate resumption of perception of broadcast program information after an interruption thereof without missing the program information presented during the interruption, comprising the steps of:

providing a recording and playback apparatus having a keyboard having a record key and a playback key; a control circuit coupled responsively to said keyboard; a memory unit coupled responsively to said control circuit, said memory unit having a medium for storage of information, said storage medium having structure which enables substantially random access to information stored in said medium for retrieval of the stored information from said storage medium; at least one input, said input being connected to a user's audio/video program signal source and also being coupled to said memory unit so as to enable program information presented by the signal source to be transferred to and stored in said memory unit; at least one output, said output being connected to a user's audio or video display device or both, said output further being connected to said memory unit so as to enable the transfer of program information from said memory unit to the user's display device, said control circuit being configured so said substantially simultaneous recording and playback of program information is achieved when said record key is first actuated to begin a recording by initiating storage of the broadcast program information in said memory unit, and said playback key is subsequently and solely actuated to begin playback of the stored program information by initiating retrieval of the program information stored in said memory unit from the beginning thereof;

actuating said record key upon the beginning of the interruption to initiate storage of the broadcast program information in said memory unit; and actuating said playback key upon the conclusion of the interruption to initiate retrieval and display of the program information stored in said memory unit from the beginning thereof, while continuing to store the broadcast program information.

* * * * *

UNITED STATES PATENT AND TRADEMARK OFFICE
CERTIFICATE OF CORRECTION

| | | |
|---|---|---|
| PATENT NO. | : 5,930,444 | Page 1 of 1 |
| APPLICATION NO. | : 08/234727 | |
| DATED | : July 27, 1999 | |
| INVENTOR(S) | : Elie Camhi and Lawrence S. Kamhi | |

It is certified that error appears in the above-identified patent and that said Letters Patent is hereby corrected as shown below:

At claim 14, line 28, replace "so said" with --so that--

Signed and Sealed this
Twenty-seventh Day of November, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 5,930,444 | Page 1 of 1 |
| APPLICATION NO. | : 08/234727 | |
| DATED | : July 27, 1999 | |
| INVENTOR(S) | : Elie Camhi and Lawrence S. Kamhi | |

It is certified that error appears in the above-identified patent and that said Letters Patent is hereby corrected as shown below:

At claim 14, Column 10, line 28, replace "so said" with --so that--

This certificate supersedes the Certificate of Correction issued November 27, 2012.

Signed and Sealed this
Eighth Day of January, 2013

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 5,930,444 |
| APPLICATION NO. | : 08/234727 |
| DATED | : July 27, 1999 |
| INVENTOR(S) | : Elie Camhi and Lawrence S. Kamhi |

It is certified that error appears in the above-identified patent and that said Letters Patent is hereby corrected as shown below:

At claim 1, column 8, line 32, replace "perception of program information" with
--perception of broadcast program information--

Signed and Sealed this
Fifth Day of March, 2013

Teresa Stanek Rea
*Acting Director of the United States Patent and Trademark Office*

(12) SUPPLEMENTAL EXAMINATION CERTIFICATE
United States Patent
Camhi et al.

(10) Number: US 5,930,444 F1
(45) Certificate Issued: May 9, 2013

Control No.: 96/000,013
Primary Examiner: Hetul Patel

Filing Date: Mar. 11, 2013

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 4,856,081 | 08-08-1989 | Smith |
| 5,134,499 | 07-28-1992 | Sata et al. |
| 5,241,428 | 08-31-1993 | Goldwasser et al. |

OTHER DOCUMENTS

Paper No. 25 of the Prosecution History of the US 5,930,444 patent (Amendment D submitted to the Patent Office on July 22, 1996).

Paper No. 26 of the Prosecution History of the US 5,930,444 patent (Office Action dated November 27, 1996).

Paper No. 27 of the Prosecution History of the US 5,930,444 patent (Examiner Interview Summary dated January 15, 1997 and mailed on April 30, 1997).

Paper No. 28 of the Prosecution History of the US 5,930,444 patent (Interview Summary dated April 30, 1997).

Paper No. 30 of the Prosecution History of the US 5,930,444 patent (Supplemental Amendment E submitted to the Patent Office on October 29, 1997).

Paper No. 34 of the Prosecution History of the US 5,930,444 patent (Notice of Allowance dated February 1, 1999).